United States Patent [19]

Hofmann et al.

[11] Patent Number: 4,508,397
[45] Date of Patent: Apr. 2, 1985

[54] ANTI-FRICTION BEARING WITH ASSEMBLY FEATURE

[75] Inventors: Heinrich Hofmann, Schweinfurt; Dieter Treutlein, Grafenrheinfeld, both of Fed. Rep. of Germany

[73] Assignee: FAG Kugelfischer Georg Schafer Kommanditgesellschaft auf Aktien, Fed. Rep. of Germany

[21] Appl. No.: 491,889

[22] Filed: May 5, 1983

[30] Foreign Application Priority Data

May 17, 1982 [DE] Fed. Rep. of Germany ....... 3218546

[51] Int. Cl.³ .................. F16C 19/02; F16C 43/06
[52] U.S. Cl. .................. 384/510; 384/545; 29/148.4 A
[58] Field of Search ............ 29/148.4 R, 148.4 A, 29/148.4 B, 148.5 R; 308/179.5, 189 R, 207 R, 210, 190, 191, 192, 216; 403/11, 12

[56] References Cited

U.S. PATENT DOCUMENTS 3,374,524 3/1968 Sutowski ............... 29/148.4 A X
4,244,630 1/1981 Tischer .................. 308/189 R

FOREIGN PATENT DOCUMENTS 2008385 9/1971 Fed. Rep. of Germany .
2416282 10/1975 Fed. Rep. of Germany ....... 384/527

Primary Examiner—John Petrakes
Assistant Examiner—David Werner
Attorney, Agent, or Firm—Ostrolenk, Faber, Gerb & Soffen

[57] ABSTRACT

The disclosure concerns an anti-friction bearing with a specially formed shoulder on its bushing. The bearing includes a shaft with two axially spaced raceways formed in it. Two outer races are associated with the respective raceways. A plurality of ball bearing elements are supported within the raceways. There are cages for guiding the balls in the races. The bushing is positioned between the two outer races. When the shaft is held vertically and the ball bearing elements are to be loaded in the top raceway, the shaft is tilted eccentrically of the outer race at the top to provide an enlarged crescent-shaped space between the inner raceway and the outer race to receive the balls. But, the balls fall down from that space. The bushing has a shoulder on one end which extends beneath the top outer race and near to the balls at that race. The shoulder is generally crescent-shaped and extends about 180° around the bushing. The shoulder is shaped and dimensioned such that it supports the balls in the crescent-shaped space and prevents them from falling down as they are being loaded.

12 Claims, 5 Drawing Figures

Fig. 1
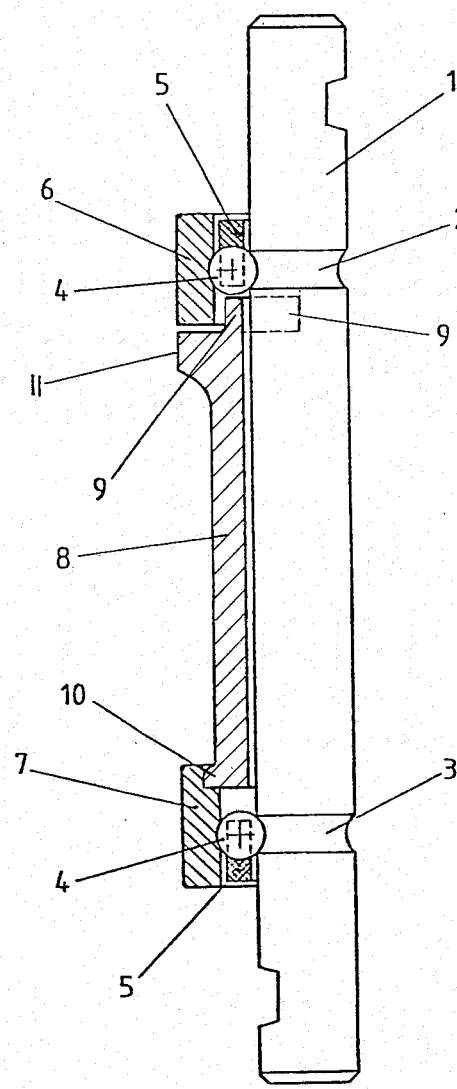
Fig. 2
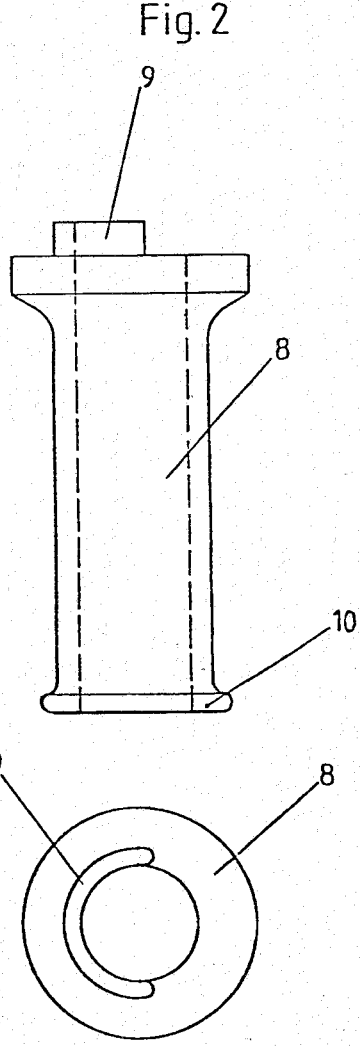
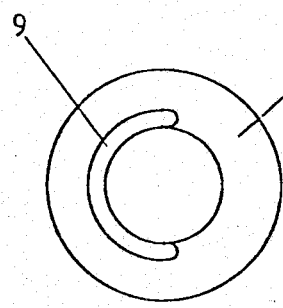
Fig. 3

Fig. 4
Fig. 5
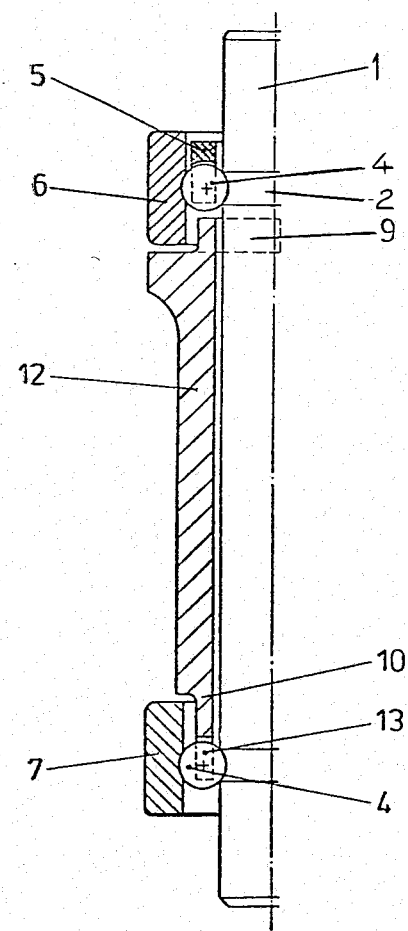
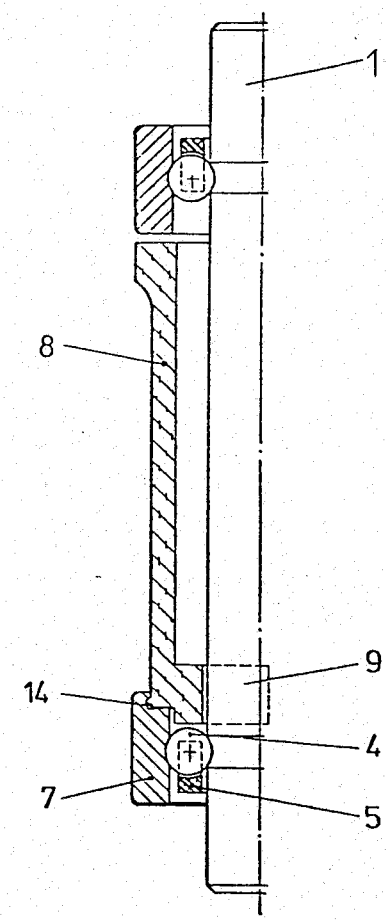

ANTI-FRICTION BEARING WITH ASSEMBLY FEATURE

BACKGROUND OF THE INVENTION

The present invention relates to an anti-friction bearing comprised of a shaft, two raceways in the shaft, two outer races, a plurality of balls serving as bearing elements between the raceways and the outer races, cage means for retaining the balls in their raceways, a bushing between the outer races and a specially formed shoulder on the bushing to enable loading of the balls in the uppermost raceway when the shaft is held vertically.

Various types of anti-friction bearings are known. These bearings, however, are difficult to assemble when their shafts are positioned vertically. In one type of anti-friction bearing shown in German Application DE-OS No. 20 08 385, a bushing is located between the outer races for fixing the axial distance between the outer races. The bushing of this bearing does not fulfill any other function. Further, this bushing is more a hindrance than a help when installing balls in the raceways in the shaft. Specifically, if one wants to provide as many balls as possible in each raceway, in order to obtain high loading capacity, it is necessary to shift the shaft eccentrically with respect to the outer races in order to be able to introduce and distribute the balls in the crescent-shaped space which is produced between the shaft and the outer race to which the shaft is eccentric. The first row of balls can be installed in the first raceway relatively easily since the bushing can in this case be omitted. Before the mounting of a second row of balls in the second raceway, however, the bushing must be put in place. Then the shaft is tilted eccentrically with respect to the second outer race which defines a crescent-shaped space between the shaft and the outer race into which the balls are introduced. The second row of balls are preferably introduced from above with the shaft positioned vertically. However, the crescent-shaped space in this case opens toward the inside of the bearing so that the balls drop out of the space between the inner raceway and the outer race. Assembly of the bearing with the shaft vertical is therefore almost impossible.

SUMMARY OF THE INVENTION

The object of the present invention, therefore, is to provide an improved anti-friction bearing of the above-mentioned type, which permits mounting of a second row of ball bearing elements, even when the shaft is positioned vertically. It is a further object to fill the axial space between the outer races, using a bushing or the like, so as to seal off the inner space and prevent the balls from falling out of their races.

The present invention provides a special bushing for installation between the outer races. The bushing is formed with a shoulder on at least one end for providing a support surface for the balls when they are introduced into the crescent-shaped space produced when the shaft is shifted eccentrically with respect to the outer race. The shoulder extends axially generally up to the area where the balls are installed in the raceway and supports the balls in that crescent-shaped space. To that end, the shoulder is also generally crescent-shaped and extends about 180° around the bushing. Further, the shoulder has a thickness such that it can normally extend between the outer race and the shaft when the shaft is returned to concentricity with the outer race. Before and during the return shifting of the shaft to its central position, the balls are held by the shoulder between the outer and inner raceways of the bearing and can then be distributed along the circumference of the raceway. There is no longer any contact of the balls with the bushing since its shoulder can be made short enough that it does not extend up to the envelope space of the balls, without adverse effect on the function of the shoulder during loading of the balls. Especially if the bushing shoulder is held under the outer race at the respective end of the bushing, the bushing can no longer be removed, whereby the bushing can simultaneously serve as a seal for the inner space.

If desired, a peripheral collar can also be provided on one end of the bushing for locking to the adjacent outer race. The bushing thereby fixes the axial distance between the outer races.

Additionally, axially extending arms can be provided on one end of the bushing, which extend between the balls in the adjacent raceway. The arms represent one specific type of cage means for holding the balls in the races.

Other objects and features of the invention will be apparent from the following description and the accompanying drawings.

BRIEF DESCRIPTION OF THE DRAWINGS

FIG. 1 is a partial cross-sectional view through a pedal bracket of a bicycle that is provided with the invention;

FIG. 2 is a side view of the bushing of the present invention;

FIG. 3 is an end view of the bushing shown in FIG. 2;

FIG. 4 is a partial cross-sectional view of an alternative embodiment of a pedal bracket of a bicycle; and FIG. 5 is the same type of view of another alternative embodiment of a pedal bracket of a bicycle.

DESCRIPTION OF THE PREFERRED EMBODIMENTS

With reference to the above figures, and more particularly with reference to FIG. 1, the pedal bracket of a bicycle includes a round shaft 1, with two axially spaced apart, annular raceways 2 and 3 formed in it. Raceways 2 and 3 are preferably high-shouldered.

Outer races 6 and 7 are positioned proximate to and are radially outside a respective raceway 2 and 3. A plurality of ball bearing elements 4 are disposed between the inner raceways 2 and 3 and the respective outer races 6 and 7. Cage means 5 at each bearing 2, 6 and 3, 7 guide the balls 4 in their races.

A bushing 8 is positioned between the outer races 6 and 7. Bushing 8 is formed with a shoulder 9 on at least one end. Shoulder 9 is shaped and dimensioned such that it is capable of supporting the balls 4 and preventing them from falling downwardly as they are being loaded in their raceway while the shaft 1 is being held vertical. Preferably, shoulder 9 extends axially far enough to be close to an enveloping circle of the balls 4 in the raceway 2. Shoulder 9 is generally crescent-shaped, and extends over an arcuate distance of about 180°. Further, shoulder 9 has a maximum radial wall thickness which is equal to or less than the distance between the shoulder covering interior surface of the outer race 6 and the shaft 1 and the shoulder 9 extends between the race 6 and the shaft 1 when the shaft is concentric in the outer race. The presence of shoulder 9 on the bushing is important in that it permits the balls 4 to be loaded with the shaft held at a vertical orientation.

First, the balls 4 associated with the vertically lower outer race 7 and inner raceway 3 are preferably mounted with bushing 8 removed in known manner. Then, the annular peripheral collar 10 at the end of the bushing 8 is fitted in a receiving groove in the inner surface of race 7. This axially fixes the race to the bushing.

Next, balls are installed at the vertically upper races 6 and 2. The shaft 1 is tilted eccentrically of the outer race 6 creating a crescent-shaped space for receiving balls at the inner raceway 2. The direction of eccentric tilting is selected so that the shoulder 9 is beneath that space. Shoulder 9 at the upper end of the bushing does not interfere with eccentric shifting of the outer race 6 with respect to shaft 1. Now the balls 4 are inserted in the crescent-shaped space on the same lateral side of the shaft 1 as the shoulder 9. Thus, with the shaft 1 held vertical, balls 4 can easily be introduced into the crescent-shaped space defined above the shoulder 9, and the shoulder prevents the balls 4 from falling downward. While the crescent-shaped space is held open, the rest of the installation of the balls and mounting of the bushing is then done in known manner.

The bushing 8 has an annular end section 11 located behind or below it and extending radially beyond shoulder 9. End section 11 abuts the adjacent axial surface of outer race 6, and in conjunction with collar 10, section 11 axially fixes the two outer races 6 and 7. Due to its collar 10 and section 11, bushing 8 is immovable relative to the outer races 6 and 7.

In the alternate embodiment shown in FIG. 4, the upper bearing, including races 2, 6 and shoulder 9, is the same as in the first embodiment. The bushing 12 is provided with a second shoulder 10' proximate to the outer race 7 at the lower bearing. Shoulder 10' is somewhat elongated as compared with upper shoulder 9, and shoulder 10' is provided with a plurality of arms 13 which extend between adjacent balls 4, up to at least the largest diameter of the balls. Arms 13 replace a more conventional cage means 5 at the lower bearing. Bushing 12 has the same relative movements with respect to shaft 2 and outer races 6 and 7 as the cage means 5 of outer race 6.

FIG. 5 shows another alternate embodiment in which bushing 8 has a peripheral collar 14 formed on the lower end. Shoulder 9 is formed on the bushing at the collar 14. No shoulder or collar is formed on the bushing at the other end. This embodiment facilitates mounting because an exact associating of the end surface of shoulder 9 with the balls 4 is obtained due to the fact that only a few tolerance points are present from the point of attachment of the outer race 7 to the collar 14 up to the end surface thereof. The balls 4 can thereby be more accurately associated with their raceways. As a result, installation of the balls becomes easier.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. An anti-friction bearing comprising:
a shaft; two axially spaced apart raceways formed in the shaft; a respective outer race positioned proximate to and radially outside each raceway; the shaft being normally concentric with the outer races and being shiftable to be eccentric with respect to at least one outer race, whereby an enlarged space is opened between the one outer race and one lateral side of the shaft when the shaft is eccentric; a plurality of balls between each of the raceways and the respective outer race;

a bushing positioned between the two outer races; a shoulder having a wall portion formed on at least one end of the bushing and extending near the balls at that raceway at the one end of the bushing; the shoulder wrapping partially around the bushing; the shoulder being shaped and dimensioned for supporting the balls at the associated raceway and for preventing the balls from falling away from the raceway when the shaft is eccentric to the associated outer race and the shoulder is positioned beneath the enlarged space.

2. The anti-friction bearing of claim 1, wherein the shoulder extends around the bushing over about 180°.

3. The anti-friction bearing of claim 1, wherein the shoulder is generally crescent-shaped.

4. The anti-friction bearing of claim 1, wherein the shoulder extends beneath the associated outer race and that outer race has a shoulder cover surface covering over the bushing.

5. The anti-friction bearing of claim 4, wherein the shoulder has a maximum wall thickness of at most the distance between the shoulder cover surface of that outer race and the shaft when the shaft and that outer race are concentric.

6. The anti-friction bearing of claim 5, wherein the shoulder extends around the bushing over about 180°.

7. The anti-friction bearing of claim 1, additionally comprising a peripheral collar positioned on one of the ends of the bushing for engaging the inward surface of the outer race at that end of the bushing for positioning the bushing with respect to that outer race.

8. The anti-friction bearing of claim 7, wherein the collar is positioned on the opposite end of the bushing from the shoulder.

9. The anti-friction bearing of claim 7, wherein the collar is positioned on the same end of the bushing as the shoulder.

10. The anti-friction bearing of claim 1, further comprising respective cage means between each inner raceway and its outer race for holding the balls in the respective raceway.

11. An anti-friction bearing comprising:
a shaft; two axially spaced apart raceways formed in the shaft; a respective outer race positioned proximate to and radially outside each raceway; the shaft being normally concentric with the outer races and being tiltable to be eccentric with respect to at least one outer race, whereby an enlarged space is opened between the one outer race and one lateral side of the shaft when the shaft is tilted eccentric to the bushing, the enlarged space being crescent-shaped for receiving the balls at the one outer race; a plurality of balls between each of the raceways and the respective outer race;

a bushing positioned between the two outer races; a shoulder having a wall portion formed on at least one end of the bushing and extending near the balls at that raceway at the one end of the bushing; the shoulder wrapping partially around the bushing; the shoulder extending beneath the associated outer race and that outer race having a shoulder cover surface covering over the bushing; the shoulder having a maximum wall thickness of at most the distance between the shoulder cover surface of that outer race and the shaft when the shaft and that outer race are concentric; the shoulder being shaped and dimensioned for supporting the balls at the associated raceway and the shoulder being shaped such that the shoulder provides a support beneath the crescent-shaped opening for balls being installed in the one outer race and the associated raceway from above for preventing the balls from falling away from the raceway when the shaft is eccentric to the associated outer race and the shoulder is positioned beneath the crescent-shaped opening.

12. An anti-friction bearing comprising:

a shaft; two axially spaced apart raceways formed in the shaft; a respective outer race positioned proximate to and radially outside each raceway; the shaft being normally concentric with the outer races and being shiftable to be eccentric with respect to at least one outer race, whereby an enlarged space is opened between the one outer race and one lateral side of the shaft when the shaft is eccentric; a plurality of balls between each of the raceways and the respective outer race;

a bushing positioned between the two outer races; a shoulder having a wall portion formed on at least one end of the bushing and extending near the balls at that raceway at the one end of the bushing; the shoulder wrapping partially around the bushing; the shoulder being shaped and dimensioned for supporting the balls at the associated raceway and for preventing the balls from falling away from the raceway when the shaft is eccentric to the associated outer race and the shoulder is positioned beneath the enlarged space; and respective cage means between each inner raceway and its outer race for holding the balls in the respective raceway; at least one of the cage means comprising arms positioned on the respective end of the bushing, the arms extending between the balls in that raceway up to at least the largest diameter of the balls in that raceway.

* * * * *